US011209061B2

United States Patent
Jenkins

(10) Patent No.: US 11,209,061 B2
(45) Date of Patent: Dec. 28, 2021

(54) BRAKE PISTON FOR DISC BRAKE ASSEMBLY

(71) Applicant: ZF ACTIVE SAFEY US INC., Livonia, MI (US)

(72) Inventor: Perry Jenkins, Livonia, MI (US)

(73) Assignee: ZF Active Safety US Inc., Livonia, MI (US)

( * ) Notice: Subject to any disclaimer, the term of this patent is extended or adjusted under 35 U.S.C. 154(b) by 84 days.

(21) Appl. No.: 16/770,668

(22) PCT Filed: Dec. 7, 2018

(86) PCT No.: PCT/US2018/064426
§ 371 (c)(1),
(2) Date: Jun. 8, 2020

(87) PCT Pub. No.: WO2019/118289
PCT Pub. Date: Jun. 20, 2019

(65) Prior Publication Data
US 2021/0172489 A1    Jun. 10, 2021

Related U.S. Application Data

(60) Provisional application No. 62/597,504, filed on Dec. 12, 2017.

(51) Int. Cl.
*F16D 55/18*    (2006.01)
*F16D 65/18*    (2006.01)
(Continued)

(52) U.S. Cl.
CPC ........... *F16D 65/18* (2013.01); *F16D 55/226* (2013.01); *F16D 2121/04* (2013.01);
(Continued)

(58) Field of Classification Search
CPC ............. F16D 2121/04; F16D 2125/06; F16D 2125/40; F16D 55/226; F16D 2121/24; F16D 65/18
See application file for complete search history.

(56) References Cited

U.S. PATENT DOCUMENTS 5,660,253 A * 8/1997 Rike ................... F16D 55/228
188/264 G
7,367,433 B2 * 5/2008 Bieker ................ F16D 65/0979
188/71.7
(Continued)

FOREIGN PATENT DOCUMENTS

DE    102007053278 A1 *  5/2009 ............ B60T 13/745
DE    102018120764 B3 * 12/2019 ............ F16D 65/18
(Continued)

OTHER PUBLICATIONS

Machine translation of DE 102018120764 (no date).*
Machine translation of DE 102007053278 (no date).*

*Primary Examiner* — Nicholas J Lane
(74) *Attorney, Agent, or Firm* — Robert James Harwood

(57) ABSTRACT

A brake piston for a disc brake assembly has a body portion and an end face of the body portion. An annularly extending first portion of the end face has a first radius and an annularly extending second portion of the end face has a second radius that is less than the first radius. A plurality of first ribs extend radially inward from the first portion to the second portion and a plurality of second ribs extends radially outward from the second portion to the first portion. The first and second ribs are interspaced. The second portion and the second ribs are recessed into the end face relative to the first portion and the first ribs.

23 Claims, 6 Drawing Sheets

(51) Int. Cl.
    *F16D 55/226*    (2006.01)
    *F16D 121/04*    (2012.01)
    *F16D 121/24*    (2012.01)
    *F16D 125/06*    (2012.01)
    *F16D 125/18*    (2012.01)
    *F16D 125/40*    (2012.01)

(52) U.S. Cl.
    CPC ...... *F16D 2121/24* (2013.01); *F16D 2125/06* (2013.01); *F16D 2125/18* (2013.01); *F16D 2125/40* (2013.01)

(56) References Cited

U.S. PATENT DOCUMENTS

| | | | |
|---|---|---|---|
| 2009/0120744 A1* | 5/2009 | Tristano | F16D 65/18 188/265 |
| 2011/0315007 A1 | 12/2011 | Koch et al. | |
| 2012/0181123 A1* | 7/2012 | Ruiz | F16D 65/0068 188/72.4 |
| 2014/0290477 A1 | 10/2014 | Ruiz et al. | |
| 2018/0080515 A1* | 3/2018 | Leidecker | F16D 65/18 |

FOREIGN PATENT DOCUMENTS

| | | |
|---|---|---|
| JP | 640986 | 6/1994 |
| JP | 2015025550 | 2/2015 |
| KR | 1020150128277 | 11/2015 |

\* cited by examiner

BRAKE PISTON FOR DISC BRAKE ASSEMBLY

This application corresponds to PCT/US2018/064426, filed Dec. 7, 2018, which claims the benefit of U.S. Provisional Application No. 62/597,504, filed Dec. 12, 2017, the disclosures of which are incorporated herein by reference in their entireties.

BACKGROUND OF INVENTION

This invention relates in general to vehicle disc brake assemblies and in particular to an improved brake piston for use with such a disc brake assembly.

A typical disc brake assembly for a vehicle includes a brake disc which is secured to a wheel of the vehicle for rotation therewith and non-rotating brake linings that are operable between non-braking and braking positions. In the non-braking position, the brake linings do not slow rotation of the brake disc. In the braking position, the brake linings are in frictional engagement with the brake disc to slow rotation of the brake disc. The brake linings are moved into frictional engagement with the brake disc by a brake piston and a sliding caliper of the disc brake assembly. For example, hydraulic pressure may linearly actuate the brake piston to displace the brake linings to frictionally engage the brake disc and provide braking. Typically, the brake piston displaces an inboard brake lining directly and an outboard brake lining via the caliper.

The disc brake assembly may also provide a parking brake function by first moving the brake linings into the braking position and then using an actuator to support the brake piston. The actuator may comprise a rotationally restrained spindle nut threaded onto a driven spindle. As the spindle is rotationally driven, the spindle nut axially translates to support the brake piston on the brake linings in the braking position. As such, an end face of the brake piston is engaged with the brake linings. Typically, the end face is engaged with an inboard brake lining carrier that supports the inboard brake lining.

Earliest designs of the inboard carrier included a solid, raised pip for the end face to engage. More recently, the end face of the brake piston may be provided with raised radial ribs from an otherwise flat surface. The radial ribs engage with the inboard carrier and limit rotation of the brake piston. The raised ribs are effective at low contact pressure to limit rotation, but at higher contact pressure increase wear on damping material on the inboard carrier. The end face contacts the damping material when the brake piston engages the inboard carrier. Alternatively, the end face of the brake piston may be a flat surface with radial recesses into the otherwise flat surface. The recesses reduce any wear to the damping material at high contact pressure, but may not sufficiently prevent rotation of the brake piston at lower contact pressure. Therefore it would be desirable to have a brake piston with an end face that sufficiently engages with the brake lining carrier at low contact pressure without overly wearing on the damping material at high contact pressure.

SUMMARY OF INVENTION

This invention relates to a brake piston for use in a disc brake assembly and a disc brake assembly including such a brake piston.

According to one embodiment, a brake piston for a disc brake assembly may comprise, individually and/or in combination, one or more of the following features: a body portion; an end face of the body portion; an annularly extending first portion of the end face, wherein the first portion has a first radius; an annularly extending second portion of the end face, wherein the second portion has a second radius that is less than the first radius; a plurality of first ribs extending inward from the first portion to the second portion; and a plurality of second ribs extending outward from the second portion to the first portion, wherein the first and second ribs are interspaced and the second portion and the second ribs are recessed into the end face relative to the first portion and the first ribs.

According to this embodiment, the first portion and the first ribs are in a plane and the second portion and the second ribs are recessed into the end face for a recess depth from the plane.

According to this embodiment, the first and second ribs extend radially.

According to this embodiment, the first portion and the first ribs are in a first plane, the second portion and the second ribs are in a second plane, and the first and second planes are parallel.

According to this embodiment, the first portion is tangential to a radially outermost end of each of the second ribs and the second portion is tangential to a radially innermost end of each of the first ribs.

According to this embodiment, the brake piston may further comprise a first minimum radial width of the first portion where the first portion spans between the first ribs; and a second minimum radial width of the second portion where the second portion spans between the second ribs.

According to this embodiment, the brake piston may further comprise a continuous step separating the first portion and the first ribs from the second portion and the second ribs.

According to this embodiment, the brake piston may further comprise a side face of the body portion, wherein the first portion extends between the side face and the first and second ribs; and a center portion recessed into the end face by a recess depth from the second portion, wherein the second portion extends between the center portion and the first and second ribs.

According to this embodiment, the first and second portions extend for less than an entirety of the end face in a circumferential direction.

According to this embodiment, the first and second portions are concentric.

According to this embodiment, the brake piston may further comprise a center portion of the end face, wherein the center portion is recessed into the end face relative to the second portion.

According to this embodiment, the brake piston is an electric or electromechanically actuated brake piston.

According to another embodiment, a brake piston for a disc brake assembly may comprise, individually and/or in combination, one or more of the following features: a body having an axis; an end face of the body; an annularly extending first portion of the end face, wherein the first portion has a first radius; a plurality of first ribs extending inward from the first portion; a first plane transverse to the axis, wherein the first portion and the first ribs are in the first plane; an annularly extending second portion of the end face, wherein the second portion has a second radius that is less than the first radius; a plurality of second ribs extending outward from the second portion, wherein the first and second ribs are interspaced; and a second plane transverse to the axis, wherein the second portion and the second ribs are in the second plane and the first and second planes are separated by a recess depth.

According to this embodiment, the first and second ribs extend radially.

According to this embodiment, the first portion is tangential to radially outermost ends of the second ribs and the second portion is tangential to radially innermost ends of the first ribs.

According to this embodiment, the brake piston may further comprise a first minimum radial width of the first portion where the first portion spans between the first ribs; and a second minimum radial width of the second portion where the second portion spans between the second ribs.

According to this embodiment, the first and second portions are concentric.

According to this embodiment, the brake piston is an electric or electromechanically actuated brake piston.

According to another embodiment, a disc brake assembly may comprise, individually and/or in combination, one or more of the following features: a caliper having a cavity; a brake lining mounted to the caliper; a brake piston mounted in the cavity for displacing the brake lining; a spindle nut rotationally restrained with the brake piston; a spindle upon which the spindle nut is threaded; and an actuator having a drive assembly operatively connected to the spindle, wherein rotation of the spindle by the drive assembly moves the spindle nut to engage and move the brake piston, wherein the brake piston comprises a cylindrical body; an end face of the body; an annularly extending first portion of the end face, wherein the first portion has a first radius; an annularly extending second portion of the end face, wherein the second portion has a second radius that is less than the first radius; a plurality of first ribs extending radially inward from the first portion to the second portion; and a plurality of second ribs extending radially outward from the second portion to the first portion, wherein the first and second ribs are interspaced and the second portion and the second ribs are recessed into the end face by a recess depth relative to the first portion and the first ribs.

According to this embodiment, the first portion and the first ribs are in a first plane, the second portion and the second ribs are in a second plane, and the first and second planes are parallel.

According to this embodiment, the first portion is tangential to radially outermost ends of the second ribs and the second portion is tangential to radially innermost ends of the first ribs.

According to this embodiment, the brake piston may further comprise a first minimum radial width of the first portion where the first portion spans between the first ribs; and a second minimum radial width of the second portion where the second portion spans between the second ribs.

According to this embodiment, the brake piston is an electric or electromechanically actuated brake piston.

A potential advantage of an embodiment is a brake piston that sufficiently engages with a brake lining carrier at low contact pressure without overly wearing on any damping material at high contact pressure. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
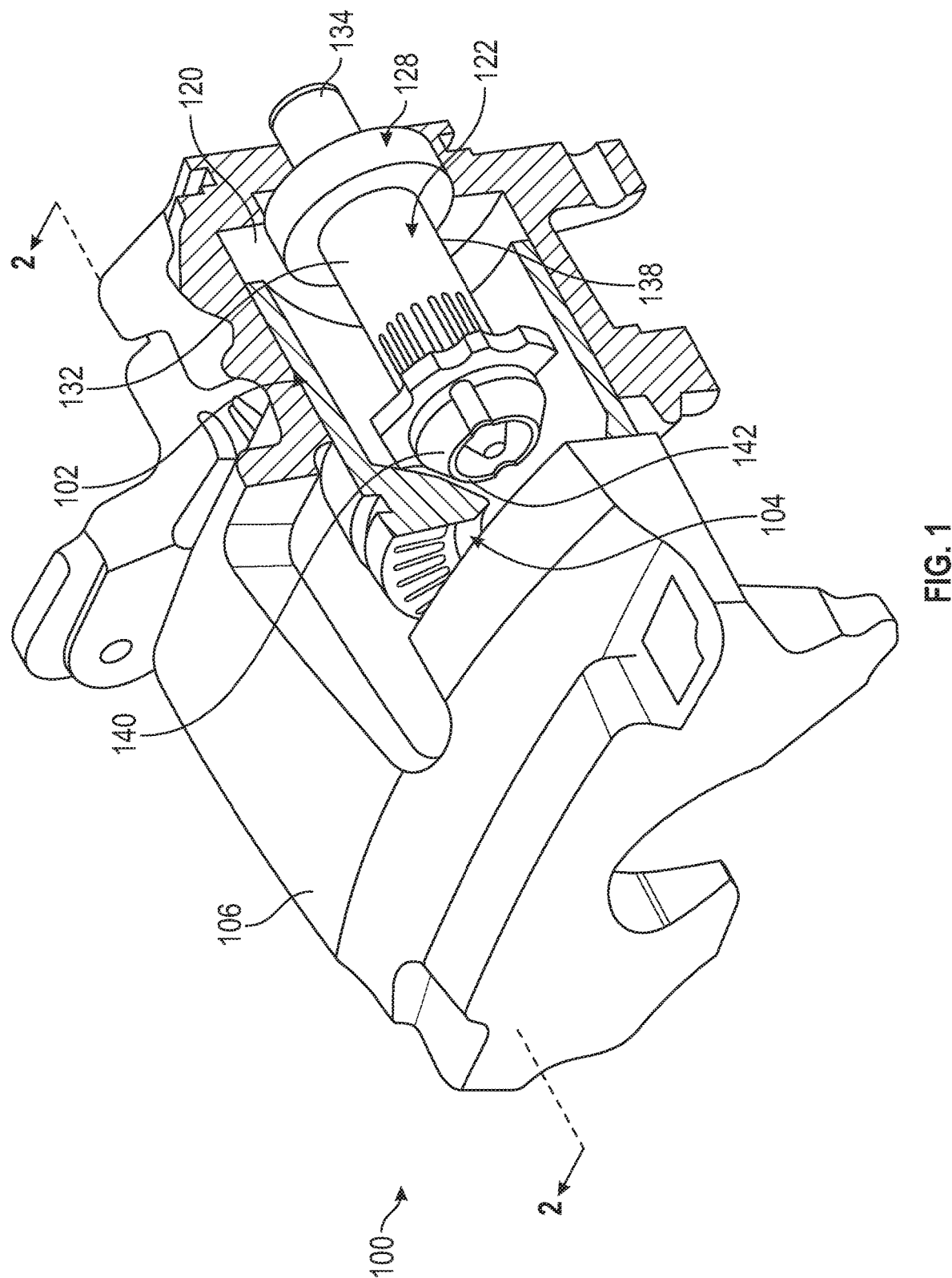
FIG. 1 is a sectional perspective view of a disc brake assembly having a brake piston in accordance with a first embodiment of the present invention.
Figure 2:
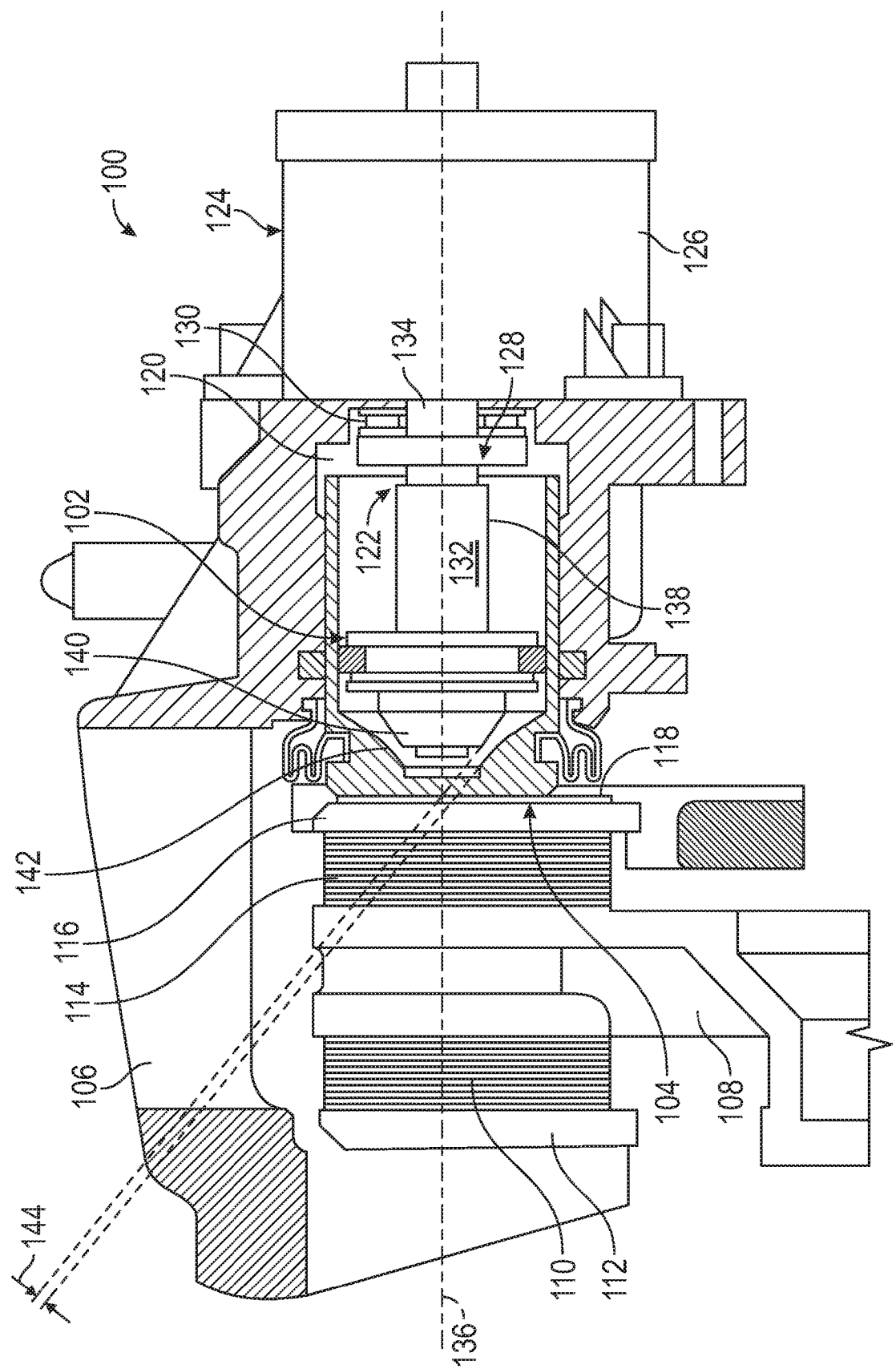
FIG. 2 is a sectional view taken along line 2-2 of FIG. 1.

Referring now to FIGS. 1 and 2, there is illustrated a disc brake assembly, indicated generally at 100, having a brake piston, indicated generally at 102. The brake piston 102 has a recessed end face, indicated generally at 104. The end face 104 will be discussed in detail with reference to FIGS. 3-5.

The general structure and operation of the disc brake assembly 100 is well known in the prior art. For example, the disc brake assembly 100 may be a disc brake assembly having an "electric" or "electromechanically" actuated parking brake (EPB), such as is disclosed by U.S. Pat. No. 8,844,683 to Sternal et al., the disclosure of which is hereby incorporated by reference in entirety herein. Although this invention will be described and illustrated in connection with the particular disc brake assembly 100 disclosed herein, i.e., EPB, it will be appreciated that this invention may be used in connection with other types or kinds of disc brake assemblies, if so desired.

The disc brake assembly 100 includes a sliding caliper 106. The caliper 106 is mounted in a floating manner by means of a brake carrier (not shown) in a manner known to those skilled in the art. The caliper 106 also spans a brake disc 108 that is coupled to a vehicle wheel (not shown) in a rotationally fixed manner.

Provided in the caliper 106 is a brake lining assembly. The brake lining assembly has an outboard brake lining 110 supported on an outboard brake lining carrier 112 and an inboard brake lining 114 supported on an inboard brake lining carrier 116. The outboard carrier 112 bears on the caliper 106 and the inboard carrier 114 bears on the brake piston 102. The outboard and inboard brake linings 110 and 114, respectively, face towards each other and, in a release position, are disposed with a small air clearance on both sides of the brake disc 108, such that no significant residual drag moments occur on the brake disc 108. The inboard carrier 116 is disposed between the inboard brake lining 114 and the brake piston 102 for the inboard brake lining 114 and the brake piston 102 to move jointly. Provided between the brake piston 102 and the inboard carrier 116 is noise reducing damping material 118. The damping material 118 damps or otherwise cushions contact between the brake piston 102 and the inboard carrier 116. As a non-limiting example, the damping material 118 may be a rubber-backed shim.

The brake piston 102 is mounted in a movable manner in a preferably cylindrical cavity 120 in the caliper 106. In addition, it can be seen that the brake piston 102 is realized so as to be hollow. Accommodated in the brake piston 102 is a rotationally restrained spindle nut, indicated generally at 122, of an electromechanical actuator, indicated generally at 124. The actuator 124 preferably includes a drive assembly 126 having a suitable power source and transmission assembly known to those skilled in the art. As a non-limiting example, the power source may be an electric motor.

A spindle, indicated generally at 128, is operatively connected to the drive assembly 126, supported via an axial bearing 130, and accommodated in a threaded manner in a threaded receiver 132 of the spindle nut 122. An output shaft 134 of the drive assembly 126 rotationally drives the spindle 128. This results in movement of the spindle nut 122 along a longitudinal axis 136 because the spindle nut 122 is rotationally restrained. An external surface 138 of the spindle nut 122 is preferably cylindrical.

The spindle nut 122 has a conical portion 140 which can be brought into bearing contact with a complementary conical inner portion 142 of the brake piston 102. In the release position, there is a clearance 144 between the conical portion 140 and the conical inner portion 142. The construction, shape, configuration, and/or make-up of the conical portion 140 and the complementary conical inner portion 142 may be other than as illustrated and described, if so desired. For example, the conical portion 140 and the conical inner portion 142 may have other, non-conical, complimentary shapes.

When service braking is desired for a vehicle having the disc brake assembly 100, the disc brake assembly 100 is hydraulically actuated. For example, the disc brake assembly 100 may be hydraulically actuated by a driver via a brake pedal or via a drive assistance system. When the disc brake assembly 100 is hydraulically actuated, hydraulic fluid is pressurized (by a suitable means known to those skilled in the art) in the cavity 120 such that the brake piston 102 is displaced leftward in FIG. 2 along the longitudinal axis 136. As a consequence, and as is known to those skilled in the art, the inboard brake lining 114 is pressed onto the brake disc 108 by the brake piston 102 (i.e., by the end face 104 pressing against the damping material 118) and, at the same time, a corresponding displacement of the caliper 106 on an opposite side of the brake disc 108 causes the outboard brake lining 110 to be drawn against the opposite side of the brake disc 108. As a result of the application of the pressurized hydraulic fluid to the cavity 120, the brake piston 102 has been displaced leftward in FIG. 2, along the longitudinal axis 136 towards the brake disc 108 and into an active braking position. The spindle nut 122 remains unactuated, and therefore remains at an initial axial position in FIG. 2.

For activating a parking brake function of the disc brake assembly 100, in a manner similar to service braking, the brake piston 102 is first put into the active braking position through application of hydraulic pressure. Actuation of the actuator 124 then causes the spindle nut 122 to be displaced towards the brake disc 108 until the clearance 144 has been used up and the conical portion 140 bears on the corresponding conical inner portion 142 inside the brake piston 102. As a result, the brake piston 102 is axially supported, via the spindle nut 122 and the axial bearing 130, on the housing of the caliper 106 in a parking brake state.

Once the brake piston 102 is axially supported, the hydraulic pressure in the cavity 120 can be removed. The parking brake state is maintained because of the position of the spindle nut 122 and because of self-arresting (for example, by a self-arresting transmission between the spindle 128 and the receiver 132). The outboard and inboard brake linings 110 and 114, respectively, pressing against the brake disc 108 are supported via the spindle nut 122.

When the parking brake state is to be released, pressurized hydraulic fluid is again introduced into the cavity 120. As a result, the brake piston 102 is displaced slightly leftward, along the longitudinal axis 136, towards the brake disc 108 such that the spindle nut 122 is relieved of axial load. Through control of the actuator 124, the spindle nut 122 can then be displaced back into the initial axial position illustrated in FIG. 2.

Figure 3:
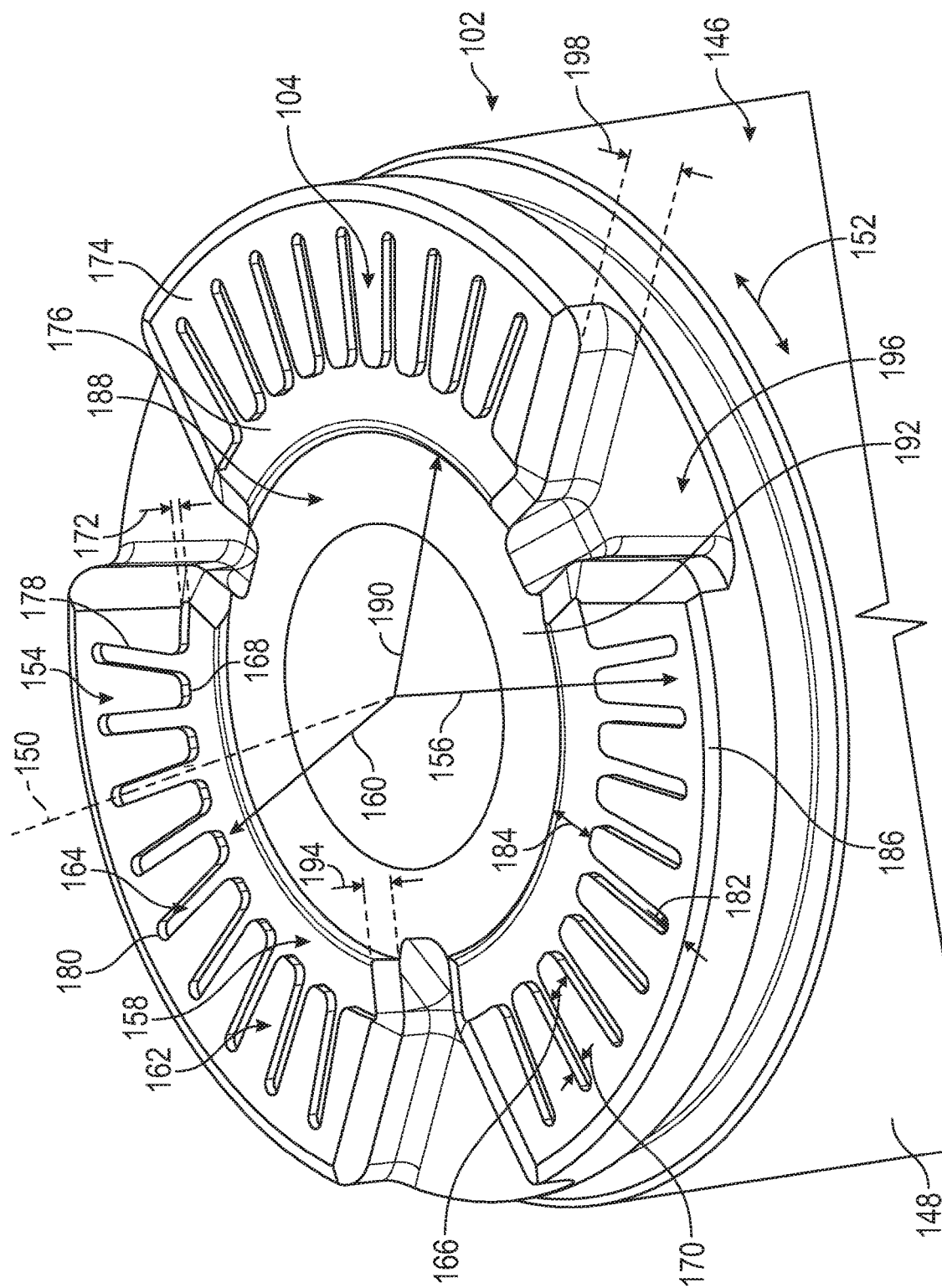
FIG. 3 is a perspective view of an end face of the brake piston of FIG. 1.
Figure 4:
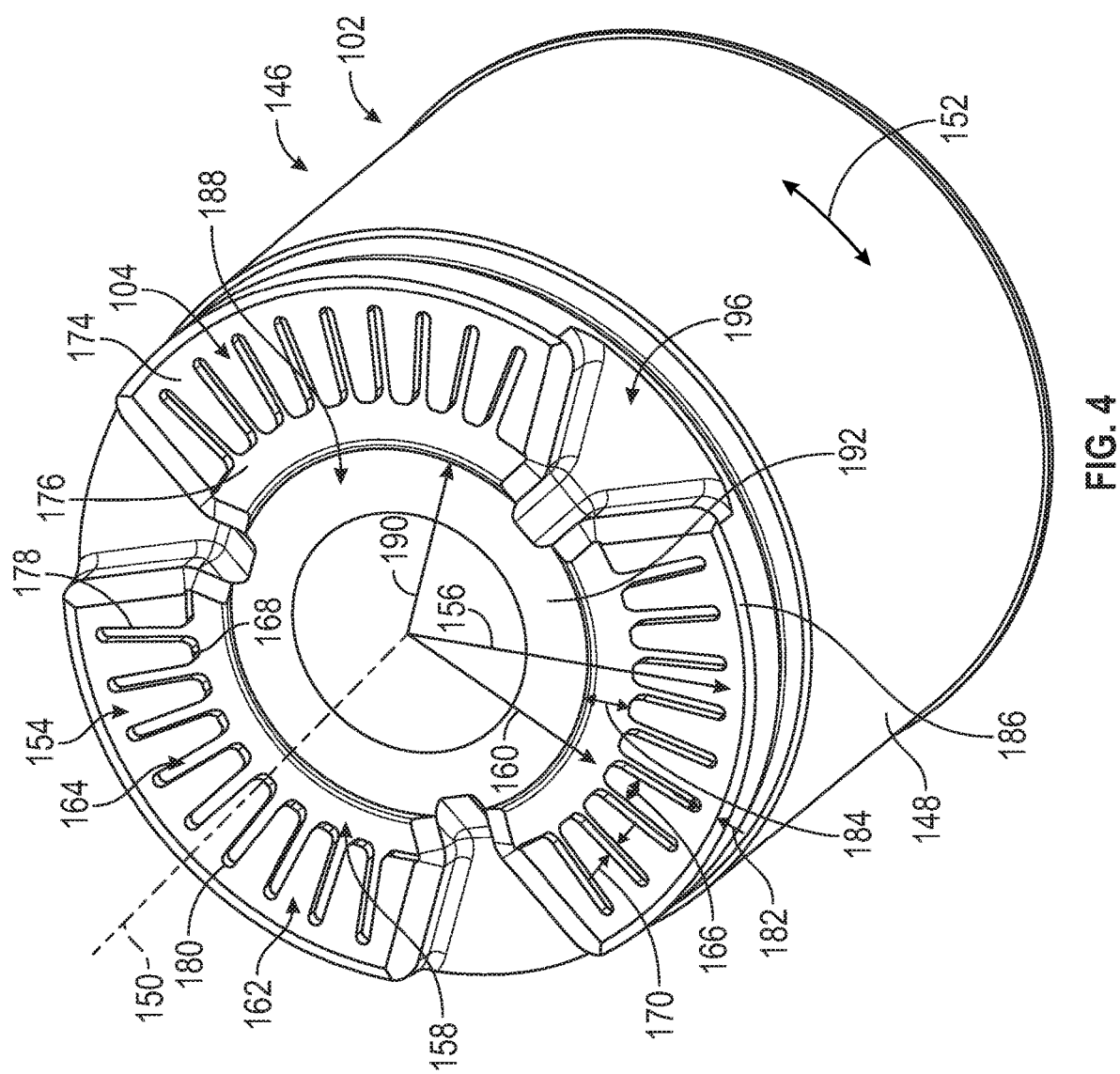
FIG. 4 is a perspective view of the brake piston of FIG. 1.
Figure 5:
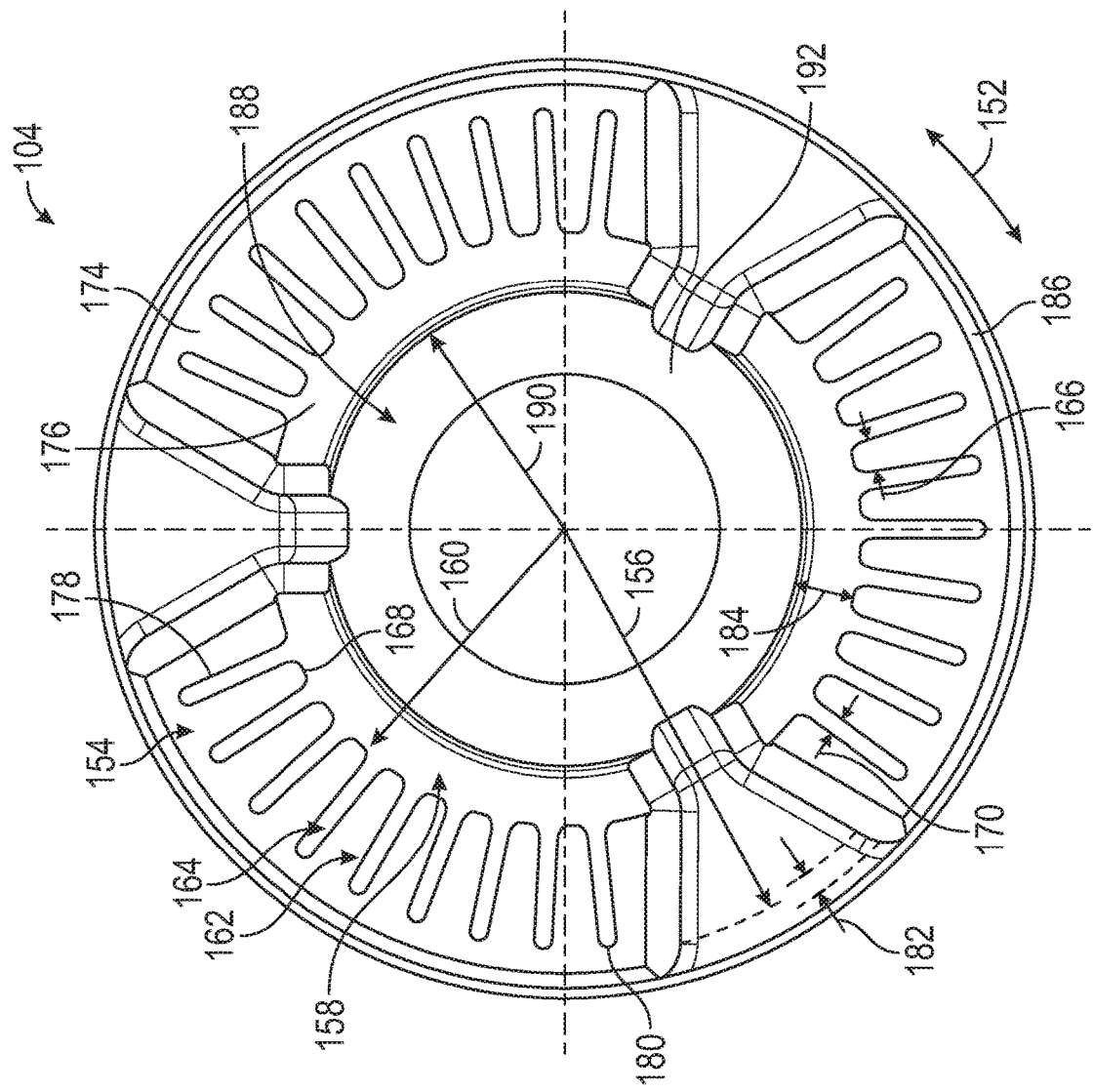
FIG. 5 is an elevation view of the end face of the brake piston of FIG. 1.

Referring now to FIGS. 3-5, there is illustrated the end face 104 of the brake piston 102 in detail. The brake piston 102 also has a body portion, indicated generally at 146, of which the end face 104 is a part. The body portion 146 further has a cylindrical side face 148. As illustrated, the end face 104 and side face 148 are perpendicular, although such is not required.

The body portion 146 extends along a longitudinal piston axis 150. The piston axis 150 is preferably co-linear with the longitudinal axis 136. The end face 104 is transverse to the piston axis 150 while the side face 148 extends along the piston axis 150. Preferably, the end face 104 is perpendicular to the piston axis 150 and the side face 148 is parallel to the piston axis 150. The end face 104 has a circumferential direction 152.

The end face 104 has an annularly extending first portion, indicated generally at 154. The first portion 154 has a first radius 156 from the piston axis 150. The end face 104 further has an annularly extending second portion, indicated generally at 158. The second portion 158 has a second radius 160 from the piston axis 150. The second radius 160 is less than the first radius 156. As non-limiting examples, the first radius 156 may be 24.5 mm and the second radius 160 may be 17.25 mm. The first and second portions 154 and 158, respectively, are concentric. As illustrated, the first and second radiuses 156 and 160, respectively, are to radial midpoints of the first and second portions 154 and 158, respectively. Alternatively, the first or second radius 156 or 160, respectively, may be defined to any point of the first or second portions 154 and 158, respectively.

The end face 104 further has protruding first ribs, ridges, or other structures, indicated generally at 162. The first ribs 162 are connected with the first portion 154 and extend radially inward from the first portion 154 to the second portion 158. As a non-limiting example, the first ribs 162 may be radially spaced every 9°. Similarly, the end face 104 has recessed second ribs, depressions, or other structures indicated generally at 164. The second ribs 164 are connected with the second portion 158 and extend radially outward from the second portion 158 to the first portion 154. As illustrated, each of the first and second ribs 162 and 164, respectively, are of uniform shape, although such is not required. The first and second ribs 162 and 164, respectively, are interspaced in the circumferential direction 152. The interspaced first and second ribs 162 and 164, respectively, form a repeating pattern around the end face 104 in the circumferential direction 152.

The first portion 154 and the first ribs 162 provide an initial contact area between the brake piston 102—i.e., the end face 104—and the inboard brake lining 114—i.e., the damping material 118 on the inboard carrier 116—when the brake piston 102 is actuated.

As illustrated, the first and second ribs 162 and 164, respectively, extend radially. Alternatively, the first and second ribs 162 and 164, respectively, may extend other than radially. As non-limiting examples, each of the first or second ribs 162 or 164, respectively, may have the shape of a curve, spiral, or chord that may or may not intersect with the piston axis 150. The first and second ribs 162 and 164, respectively, may have the same shape or different shapes. As a further non-limiting example, the first and second ribs 162 and/or 164, respectively, may form a pattern of repeating shapes such as knurling.

The first ribs 162 have a first circumferential width 166. As illustrated, the first circumferential width 166 decreases as the first ribs 162 extend radially inward from the first portion 154 to the second portion 158. As a non-limiting example, the first circumferential width 166 may be 1.0 mm at a radially innermost point 168 of each of the first ribs 162. The second ribs 164 have a second circumferential width 170. As illustrated, the second circumferential width 170 is constant as the second ribs 164 radially extend from the second portion 158 to the first portion 154. As a non-limiting example, the second circumferential width 170 may be 1.5 mm. Alternatively, the first circumferential width 166 may be other than decreasing and the second circumferential width 170 may be other than constant. As non-limiting examples, each of the first or second circumferential widths 166 or 170, respectively, may decrease, increase, or remain constant between the first and second portions 154 and 158, respectively.

The second portion 158 and the second ribs 164 are recessed into the end face 104 relative to the first portion 154 and first ribs 162 by a first recess depth 172. As a non-limiting example, the first recess depth 172 may be 0.1±0.03 mm. Preferably, the first portion 154 and the first ribs 162 are in a first plane 174 and the second portion 158 and the second ribs 164 are in a second plane 176, wherein the first and second planes 174 and 176, respectively, are separated by the first recess depth 172. As a result, the second portion 158 and the second ribs 164 are recessed into the end face 104 for the first recess depth 172. Preferably, the first and second planes 174 and 176, respectively, are parallel and/or perpendicular to the piston axis 150. Alternatively, the first and second planes 174 and 176, respectively, may be other than parallel and/or perpendicular to the piston axis 150.

A continuous step, lip, or other separation surface 178 extends between the first portion 154 and the first ribs 162 and the second portion 158 and the second ribs 164—e.g., the step 178 extends between the first and second planes 174 and 176, respectively. The step 178 divides the end face 104 between the first and second planes 174 and 176, respectively. The step 178 also extends along the piston axis 150 and is generally perpendicular to the first and second planes 174 and 176, respectively. Alternatively, the step 178 may be other than perpendicular to the first and second planes 174 and 176, respectively. As illustrated, the step 178 is planar between the first and second planes 174 and 176, respectively, although the step 178 may alternatively be non-planar. The step 178 may have a smooth (e.g., rounded or filleted) or sharp (e.g., chamfered or ninety degree) transition or junction with each of the first and second planes 174 and 176, respectively, or the step 178 may vary between smooth and sharp transitions.

The first portion 154 is tangential to a radially outermost point 180 of each of the second ribs 164. As such, the first portion 154 spans or otherwise annularly extends between the first ribs 162 and across the outermost points 180 of the second ribs 164. Similarly, the second portion 158 is tangential to the radially innermost point 168 of each of the first ribs 162 such that the second portion 158 spans or otherwise annularly extends between the second ribs 164 and across the innermost points 168 of the first ribs 162.

The first portion 154 has a first minimum radial width 182 where the first portion 154 annularly extends—i.e., spans—between the first ribs 162. As a non-limiting example, the first minimum radial width 182 may be 2.35 mm. Similarly, the second portion 158 has a second minimum radial width 184 where the second portion 158 annularly extends—i.e., spans—between the second ribs 164. As a non-limiting example, the second minimum radial width 184 may be 7.1 mm. The first and second minimum radial widths 182 and 184, respectively, are each greater than zero.

The first portion 154 extends annularly between the side face 148 and the first and second ribs 162 and 164, respectively. As such, the first and second ribs 162 and 164, respectively, do not extend to or contact the side face 148 or a lip or other junction 186 between the end face 104 and the side face 148. The second portion 158 extends annularly between a center portion, indicated generally at 188, of the end face 104 and the first and second ribs 162 and 164, respectively. As such, the first and second ribs 162 and 164, respectively, do not extend to or contact the center portion 188.

Furthermore, the recessed center portion 188 has a third radius 190 from the piston axis 150, wherein the third radius 190 is less than the first and second radiuses 156 and 160, respectively. The center portion 188 is concentric with the first and second portions 154 and 158, respectively. As illustrated, the third radius is to an outward perimeter of the center portion 188. Alternatively, the third radius may be defined to any point of the center portion 188.

The center portion 188 is recessed relative to the first and second portions 154 and 158, respectively. Preferably, the center portion 188 is in a third plane 192 that is parallel to the first and second planes 174 and 176, respectively. The third plane 192 is separated from the second plane 176 by a second recess depth 194. The third plane 192 is on a side of the second plane 176 that is opposite the first plane 174—i.e., the third plane 192 is opposite the first plane 174 across the second plane 176.

The end face 104 further includes pockets 196. As illustrated, the end face 104 includes three of the pockets 196. Alternatively, the end face 104 may include more or less than the illustrated three pockets 196 or the pockets 196 may be omitted from the end face 104. As illustrated, the pockets 196 are generally trapezoidal in shape. Alternatively, the pockets 196 may be any shape, including other than trapezoidal. The pockets 196 are recessed into the end face 104 by a third recess depth 198 that is greater than both the first and second recess depths 172 and 194, respectively.

The pockets 196 are equally spaced about the end face 104 in the circumferential direction 152. The pockets 196 extend radially across the first and second portions 154 and 158, respectively, such that the first and second portions 154 and 158, respectively, as well as the first and second ribs 162 and 164, respectively, extend for less than an entirety of the end face 104 in the circumferential direction 152—i.e., the pockets 196 interrupt the first and second portions 154 and 158, respectively, and the first and second ribs 162 and 164, respectively, in the circumferential direction 152.

Figure 6:
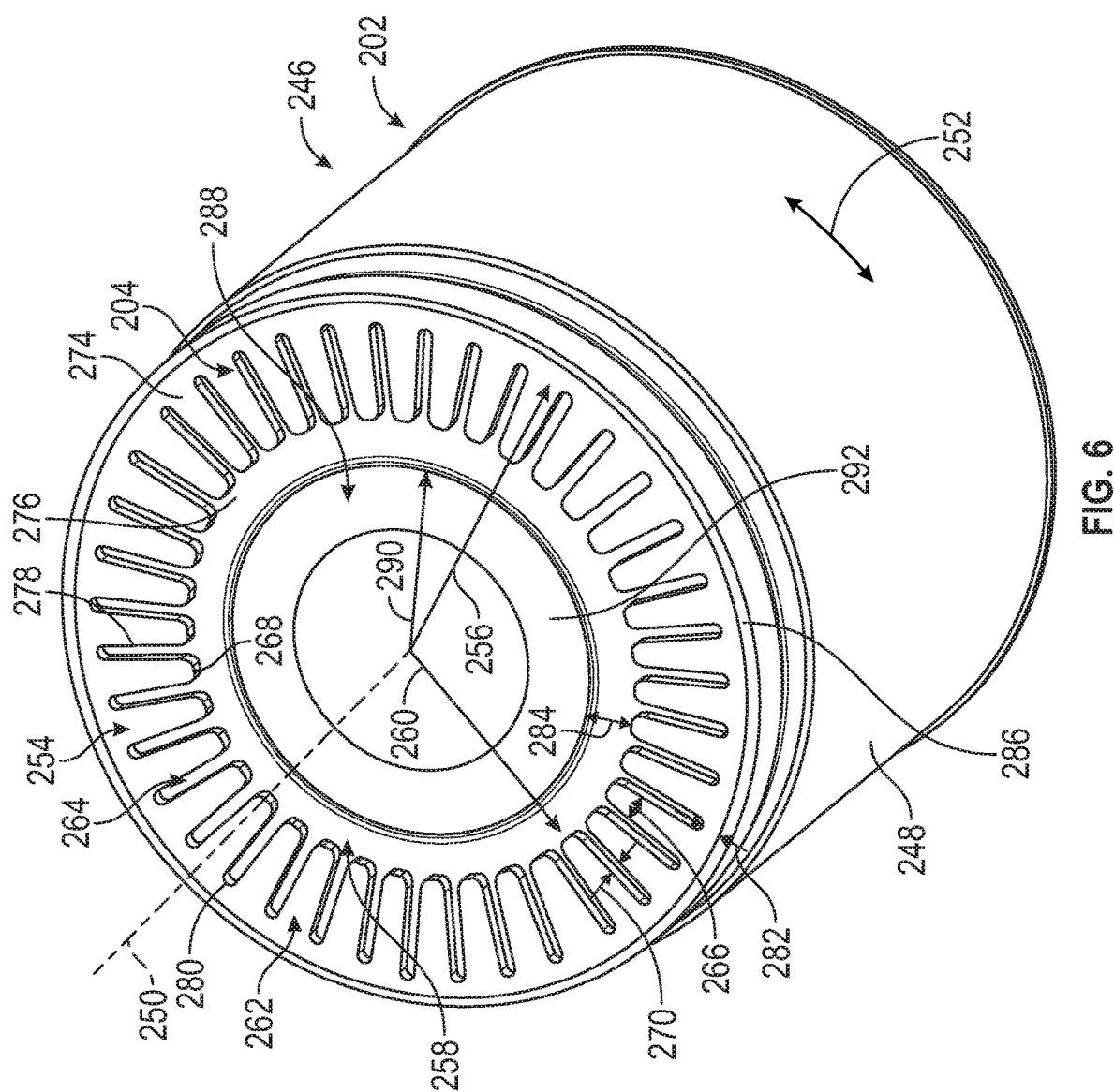
FIG. 6 is a perspective view of an end face of a brake piston in accordance with a second embodiment of the present invention.

Referring now to FIG. 6, there is illustrated a second embodiment of a brake piston 202 having an end face 204, produced in accordance with the present invention. The brake piston 202 and the end face 204 are a variation of the brake piston 102 and the end face 104 of FIGS. 1-5. As such, like reference numerals, increased by 100, designate corresponding parts in the drawings and detailed description thereof will be omitted.

The end face 204 has first and second portions 254 and 258, respectively, and first and second ribs 262 and 264, respectively. The first and second portions 254 and 258, respectively, as well as the first and second ribs 262 and 264, respectively, are continuous and have a repeating pattern for an entirety of the end face 204 in a circumferential direction 252.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A brake piston for a disc brake assembly, the brake piston comprising:
    a body portion;
    an end face of the body portion;
    an annularly extending first portion of the end face, wherein the first portion has a first radius;
    an annularly extending second portion of the end face, wherein the second portion has a second radius that is less than the first radius;
    a plurality of first ribs extending inward from the first portion to the second portion; and
    a plurality of second ribs extending outward from the second portion to the first portion, wherein the first and second ribs are interspaced and the second portion and the second ribs are recessed into the end face relative to the first portion and the first ribs.

2. The brake piston of claim 1 wherein the first portion and the first ribs are in a plane and the second portion and the second ribs are recessed into the end face for a recess depth from the plane.

3. The brake piston of claim 1 wherein the first and second ribs extend radially.

4. The brake piston of claim 1 wherein the first portion and the first ribs are in a first plane, the second portion and the second ribs are in a second plane, and the first and second planes are parallel.

5. The brake piston of claim 1 wherein the first portion is tangential to a radially outermost end of each of the second ribs and the second portion is tangential to a radially innermost end of each of the first ribs.

6. The brake piston of claim 1 further comprising:
    a first minimum radial width of the first portion where the first portion spans between the first ribs; and
    a second minimum radial width of the second portion where the second portion spans between the second ribs.

7. The brake piston of claim 1 further comprising:
    a continuous step separating the first portion and the first ribs from the second portion and the second ribs.

8. The brake piston of claim 1 further comprising:
    a side face of the body portion, wherein the first portion extends between the side face and the first and second ribs; and
    a center portion recessed into the end face by a recess depth from the second portion, wherein the second portion extends between the center portion and the first and second ribs.

9. The brake piston of claim 1 wherein the first and second portions extend for less than an entirety of the end face in a circumferential direction.

10. The brake piston of claim 1 wherein the first and second portions are concentric.

11. The brake piston of claim 1 further comprising:
    a center portion of the end face, wherein the center portion is recessed into the end face relative to the second portion.

12. The brake piston of claim 1 wherein the brake piston is an electric or electromechanically actuated brake piston.

13. A brake piston for a disc brake assembly, the brake piston comprising:
    a body having an axis;
    an end face of the body;
    an annularly extending first portion of the end face, wherein the first portion has a first radius;
    a plurality of first ribs extending inward from the first portion;
    a first plane transverse to the axis, wherein the first portion and the first ribs are in the first plane;
    an annularly extending second portion of the end face, wherein the second portion has a second radius that is less than the first radius;
    a plurality of second ribs extending outward from the second portion, wherein the first and second ribs are interspaced; and
    a second plane transverse to the axis, wherein the second portion and the second ribs are in the second plane and the first and second planes are separated by a recess depth.

14. The brake piston of claim 13 wherein the first and second ribs extend radially.

15. The brake piston of claim 13 wherein the first portion is tangential to radially outermost ends of the second ribs and the second portion is tangential to radially innermost ends of the first ribs.

16. The brake piston of claim 13 further comprising:
    a first minimum radial width of the first portion where the first portion spans between the first ribs; and
    a second minimum radial width of the second portion where the second portion spans between the second ribs.

17. The brake piston of claim 13 wherein the first and second portions are concentric.

18. The brake piston of claim 13 wherein the brake piston is an electric or electromechanically actuated brake piston.

19. A disc brake assembly comprising:
    a caliper having a cavity;
    a brake lining mounted to the caliper;
    a brake piston mounted in the cavity for displacing the brake lining, the brake piston comprising:
        a cylindrical body;
        an end face of the body;
        an annularly extending first portion of the end face, wherein the first portion has a first radius;
        an annularly extending second portion of the end face, wherein the second portion has a second radius that is less than the first radius;
        a plurality of first ribs extending radially inward from the first portion to the second portion; and
        a plurality of second ribs extending radially outward from the second portion to the first portion, wherein the first and second ribs are interspaced and the second portion and the second ribs are recessed into the end face by a recess depth relative to the first portion and the first ribs;
    a spindle nut rotationally restrained with the brake piston;
    a spindle upon which the spindle nut is threaded; and
    an actuator having a drive assembly operatively connected to the spindle, wherein rotation of the spindle by the drive assembly moves the spindle nut to engage and move the brake piston.

20. The disc brake assembly of claim 19 wherein the first portion and the first ribs are in a first plane, the second portion and the second ribs are in a second plane, and the first and second planes are parallel.

21. The disc brake assembly of claim 19 wherein the first portion is tangential to radially outermost ends of the second ribs and the second portion is tangential to radially innermost ends of the first ribs.

22. The disc brake assembly of claim 19 further comprising:
- a first minimum radial width of the first portion where the first portion spans between the first ribs; and
- a second minimum radial width of the second portion where the second portion spans between the second ribs.

23. The disc brake assembly of claim 19 wherein the brake piston is an electric or electromechanically actuated brake piston.

* * * * *